United States Patent [19]

Chefson

[11] Patent Number: 4,942,953

[45] Date of Patent: Jul. 24, 1990

[54] SLEEVES FOR UNLOADING

[75] Inventor: Patrice Chefson, St.-Aubin les Elbeuf, France

[73] Assignee: Spiragaine S.A., Saint Aubin les Elbeuf, France

[21] Appl. No.: 327,620

[22] Filed: Mar. 23, 1989

[30] Foreign Application Priority Data

Mar. 23, 1988 [FR] France ............................... 88 03810

[51] Int. Cl.$^5$ ............................................. B65G 11/14
[52] U.S. Cl. ................................... 193/25 C; 193/2 R
[58] Field of Search ............... 193/25 C; 198/311, 536

[56] References Cited

U.S. PATENT DOCUMENTS 3,738,464  6/1973  Ortlip et al. ...................... 193/25 C
4,182,591  1/1980  Stanelle ......................... 193/25 C X
4,557,364 12/1985  Ball ................................ 193/25 C

FOREIGN PATENT DOCUMENTS 2744590  4/1979  Fed. Rep. of Germany .... 193/25 C
2821210 11/1979  Fed. Rep. of Germany .
836990   6/1960  United Kingdom ............. 193/25 C Primary Examiner—Robert J. Spar
Assistant Examiner—D. Glenn Dayoan
Attorney, Agent, or Firm—Fisher, Christen & Sabol

[57] ABSTRACT

A device for loading bulk products of the type comprising a sleeve adapted to guide bulk materials from an upper hopper towards a lower container, formed by a supple wall provided with reinforcing hoops. The sleeve is retractable by mechanical action. The device has an inner protecting liner disposed at one end, upper or lower, of the sleeve. The liner is concentric, and inside the sleeve, and of diameter corresponding substantially to a small clearance to the inner diameter of the portions folded in accordion manner between two reinforcing hoops. The liner is thus adapted to receive against its outer wall the folded part of the sleeve, placed in an inactive position, resulting in the active part of the sleeve conveying the bulk materials always remaining in a stretched position.

9 Claims, 3 Drawing Sheets

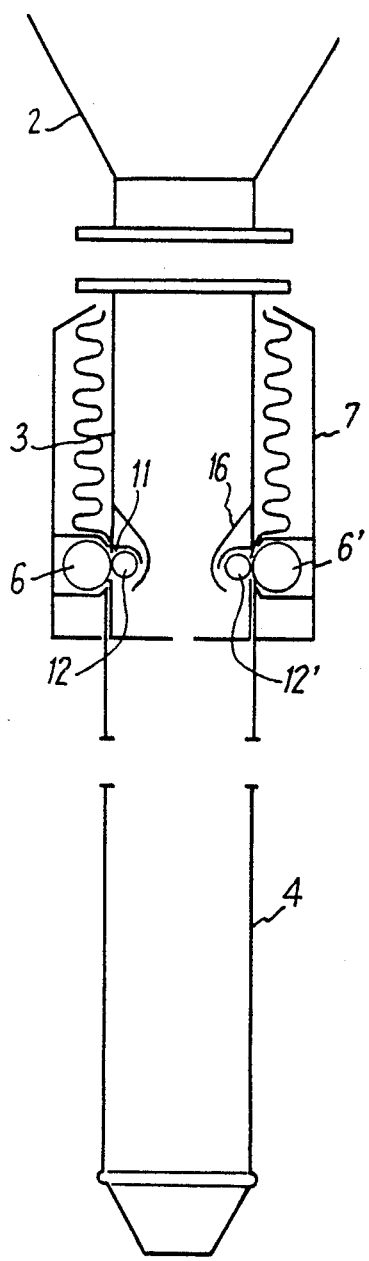
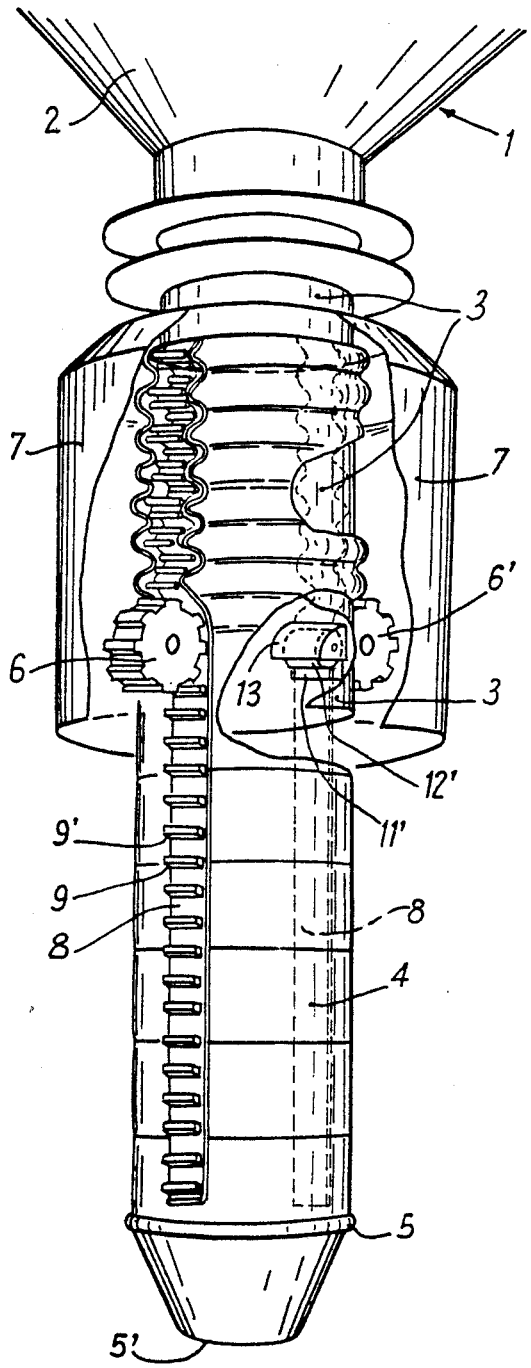
Fig. 1
Fig. 2

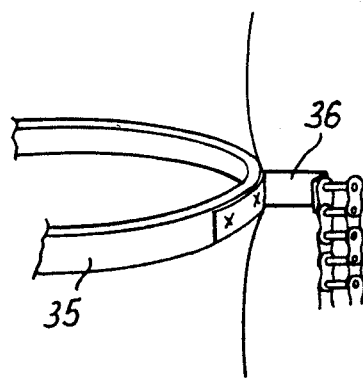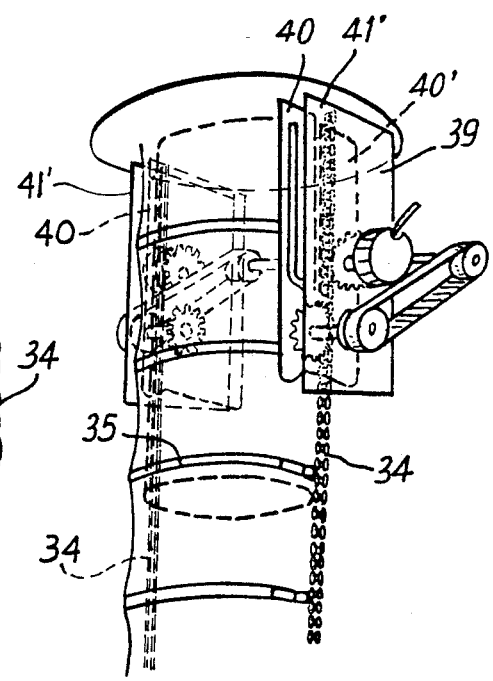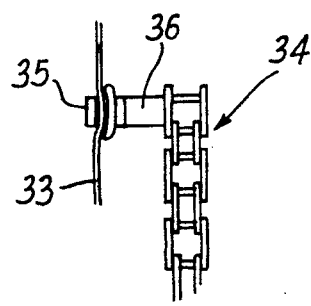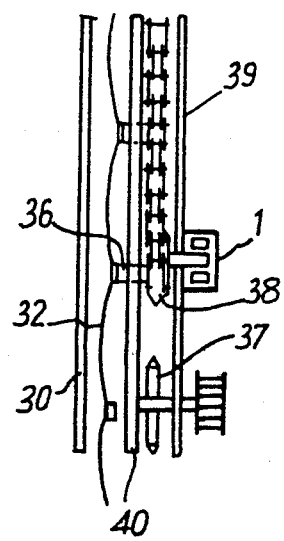

SLEEVES FOR UNLOADING

FIELD OF THE INVENTION

The present invention relates to sleeves for loading, used in particular at the base of a reservoir, hopper or silo for the purpose of guiding the solid materials in bulk (particularly in pulverulent form) poured from this upper container towards a lower container such as a tank, bucket or the like.

BACKGROUND OF THE INVENTION

Sleeves of this type are currently used for loading a transportable container, for example mounted on a lorry, truck, or possibly ships or barges.

The sleeves of this type are generally constituted by a tubular structure of supple material provided at regular intervals with reinforcing elements in the form of stepped hoops or rings or helically disposed turns.

These devices allow an unused part of the sleeve to be retracted in accordeon-like manner in order to clear the free space beneath the silo or the loading assembly in particular to allow the carrying vehicle to arrive and depart.

The sleeve is conventionally raised by a traction exerted from an upper winch on cables or ropes supporting by their lower ends a discharging cone at which the end of the sleeve terminates.

In the most frequent case of the sleeve not being totally in position of extension, a part thereof, contracted or folded in accordeon form, consequently remains at the base of the sleeve.

This part, retracted in the manner of an accordeon, reduces the diameter of passage of the sleeve with respect to the stretched part, with the result that the pulverulent or granular materials which finish their fall with a considerable force of percussion, strike against this retracted part, causing rapid wear and tear due to the abrasive action of the materials.

It is a first object of the invention to provide a sleeve of which the active part, serving for transit of the products from the base of the hopper or silo towards the receiving container, is in stretched position without retracted fold, consequently offering a relatively smooth surface when the bulk materials drop, and avoiding sources of abrasion.

A further object of the invention is to avoid the formation at the base of the sleeve, in the retracted part, of pockets in which the products might accumulate.

SUMMARY OF THE INVENTION

To that end, the invention relates to a device for loading bulk products, of the type comprising a sleeve adapted to guide bulk materials from an upper hopper towards a lower container, formed by a supple wall provided with reinforcing hoops, said sleeve being retractable under the action of mechanical means, said device being characterized in that it comprises an inner protecting liner disposed at one end, upper or lower, of the sleeve, the liner being concentric and inside the sleeve and of diameter corresponding substantially, with a small clearance, to the inner diameter of the portions, folded in accordeon manner, between two reinforcing hoops, the liner thus being adapted to receive against its outer wall the folded part of the sleeve placed in inactive position, with the result that the active part of the sleeve conveying the bulk materials always remains in stretched position.

According to one embodiment, the liner is in low position and it is fast with an outer cone defining the opening of the sleeve adapted to penetrate in the filling opening, and the liner comprises at its base a free annular passage between the base of the wall of the liner and the base of the folded sleeve to allow evacuation of the dust and particles having penetrated and accumulating between the two concentric walls of the sleeve and the inner liner respectively.

According to a second, preferred embodiment of the invention, the protecting liner is located in the upper part of the sleeve and it is adapted to receive the folded part of the sleeve constituted by the upper part thereof and the sleeve comprises to that end lifting means in engagement on the reinforcing hoops and adapted to provoke the initial fold by upwardly lifting an upper hoop before the lower hoop, the accumulation of the folds and the hoops thus being effected towards the upper part around the upper central liner, the active, lower part of the sleeve below said liner thus being totally maintained in stretched position.

More especially in that case, the lifting means are constituted by at least and preferably two supple, foldable ties connected at regular intervals to the reinforcing hoops and these ties follow a generatrix of the sleeve, being furthermore subjected to the action of driving means in mesh on each of the ties, being adapted to ensure raising and lowering thereof.

More especially, the driving means are disposed at a level corresponding to the base of the inner protecting liner, itself disposed in upper position with respect to the assembly of the sleeve, and these driving means are provided to allow, during lifting of the supple tie, the accumulation of the hoops in folded position of the sleeve above said driving means and around the central liner.

More particularly still, the supple ties are constituted by at least two chains each disposed along a generatrix of the sleeve, the two chains being diametrically opposite with respect to the tubular sleeve, and the chains are connected at regular intervals to each hoop, each chain meshing on a driving wheel, the two driving wheels being themselves synchronized, and each chain is in addition associated with a retaining brake constituted by a toothed wheel in mesh on the chain and disposed above the corresponding driving wheel.

According to another feature, two brakes, each associated with a chain, are disposed above and at a suitable distance from the corresponding driving wheel and each of the brakes is adapted to allow rest and support of the last of the hoops belonging to the stack of the folded part of the sleeve, this folded part resting by gravity on the lower hoop itself blocked in position on each side by the brakes, the two brakes being mounted to roll freely in a direction corresponding to the lifting movement of the hoops and being calibrated on the one hand to withstand the thrust corresponding to the weight of the sleeve in maximum retracted position, and on the other hand to yield to an effort of traction, greater than the above weight, during the traction exerted by the driving wheels driving the chain in the movement of descent and of downward pull of the lower hoop from the upper stack.

More particularly still, each lifting assembly located on two diametrically opposite sides of the sleeve, comprises two parallel plates located in vertical planes, the inner volume between the two plates defining a space for the displacement and storage of the chain as well as for the engagement of said chain on the driving wheels and the brake, respectively, and the plate located against the sleeve comprises a vertical groove allowing guiding of a joining piece connecting each of the successive hoops to the chain and ensuring, within the stack, the superposition of the hoops in aligned position.

According to a variant embodiment, the sleeve comprises a system of lifting from the top constituted by two linear supports made of supple material formed in particular by a band of synthetic elastomer material and provided with stepped ribs and adapted to receive the mechanical action of a toothed wheel disposed opposite.

According to a likewise important feature of the invention, the upper part of the sleeve corresponding to the pouring of the bulk materials from the hopper or the upper container inside the sleeve, comprises an initial narrowing forming a nozzle effect allowing, on the one hand, the acceleration of the vertical descending movement of the particles and the bringing together and concentration of the major part of the bulk materials towards the centre of the sleeve, thus saving the walls.

BRIEF DESCRIPTION OF THE DRAWINGS

The invention will be more readily understood on reading the following description with reference to the accompanying drawings, in which:

FIG. 1 shows a schematic view in section of a first embodiment of the device according to the invention.

FIG. 2 shows a view in perspective with parts torn away, of the embodiment of FIG. 1.

FIG. 5 shows a view in perspective of the device according to FIG. 4.

FIG. 6 shows a view in detail in perspective showing the connection of the lifting chain to the reinforcing hoops.

FIG. 7 shows the same detail of assembly as FIG. 6, but seen in vertical section.

FIG. 8 shows a view in vertical cross section of a section of the sleeve and of the lifting device according to FIGS. 4, 5, 6 and 7.

DETAILED DESCRIPTION OF THE DRAWINGS

Figure 3:
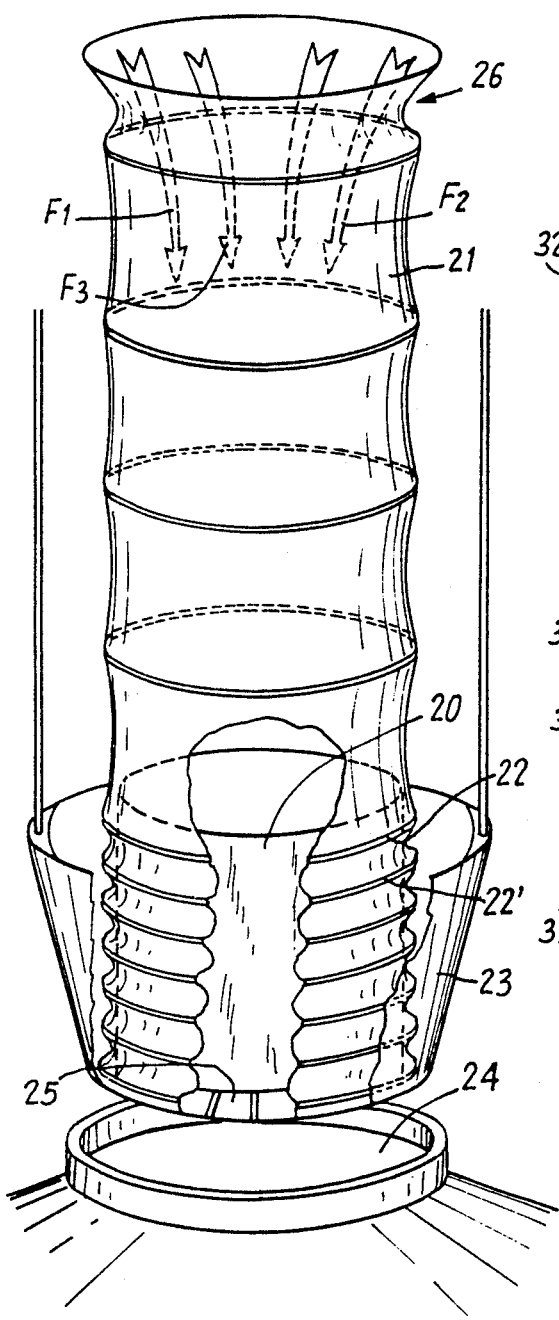
FIG. 3 shows a view in perspective, with parts torn away, of a second embodiment of the invention.

Referring now to the drawings, FIGS. 1 and 2 show that the pouring and loading device is located at the base 1 of a hopper or silo 2.

An inner liner 3 is connected to the base of the silo and it receives on its outer face the top of the sleeve made according to a first embodiment of the invention.

This sleeve, in the case of FIGS. 1 and 2, is formed by a tubular wall 4 made of supple material allowing the sleeve to be folded in retracted or compacted position in manner known per se.

The supple structure 4 comprises reinforcing elements constituted here by annular hoops.

The active part of the sleeve 4 which projects below the liner. 3 and which terminates in the base 5, 5' in the receiving container, is, over the whole of its length, in stretched position, the retracted part of the sleeve which is located around the liner 3 being in inactive position.

To that end, the sleeve is associated with lifting means constituted by toothed wheels 6, 6' mounted on and against the outer walls of the sleeve. These toothed wheels undergo the action of maneuvering members (not shown) and they attack and mesh on a rack-type device constituted by bands disposed along two diametrically opposite generatrices on the walls of the sleeve.

Each band is constituted by a semi-rigid material, for example elastomer and each band 8 comprises transverse ribs 9, 9', band 8 being glued on the wall of the sleeve.

In order to facilitate maneuver of the sleeve under the action of the wheels 6 and 6', two bearing pulleys 12 and 12' may be provided, located opposite the toothed wheels 6 and 6'. These pulleys are mounted on a bracket 13 supported by the inner wall of the liner 3 concentric to and inside the sleeve; pulleys 12 and 12' are located opposite a window 11, 11' which ensures passage of a small part of the pulley to perform its function.

It will be understood that the maneuver of the toothed wheels 6 and 6' makes it possible to raise the sleeve, of which the lower active part is always in stretched position, the retracted part of the sleeve being protected by the inner liner 3 concentric to the sleeve.

FIG. 3 shows an embodiment in which the protecting liner 20 is located at the base of the sleeve 21.

This protecting liner receives on its outer wall the stack of hoops 22, 22' corresponding to the inactive part of the sleeve which is here collected at the base thereof.

The base of the sleeve here comprises an outer cone 23 which allows the base of the sleeve to fit on the opening 24 of the receiving container during filling.

The outer cone 23 is concentric to the inner liner 20.

In this embodiment, the base of the sleeve joins the base of the cone 23; on the contrary, the base of the liner 20 remains separate from the base of the cone 23 by a slight gap 25.

This gap 25 constitutes the opening of the ring-shaped space which separates the liner 23 from the stack of hoops 22, 22'.

This passage 25 allows release and downward drop of the dust which penetrates and accumulates in the interstitial annular space between the liner 20 and the retracted part of the sleeve.

In this embodiment, a restriction 26 is noted at the top of the sleeve, which centres the fall of the particles of bulk materials, keeping them apart from the walls, with the result that the major part of the solid materials poured will join the protecting liner 20 in order to be poured into the opening 24, saving the walls of the sleeve.

Such narrowing 26 thus provokes a nozzle effect with directional concentration of materials as shown by arrows F1, F2, F3. Apart from a reduction in wear and tear of the walls of the sleeve, the movement of the particles is accelerated, since they are not slowed down by contact with the walls, this improving output.

Figure 4:
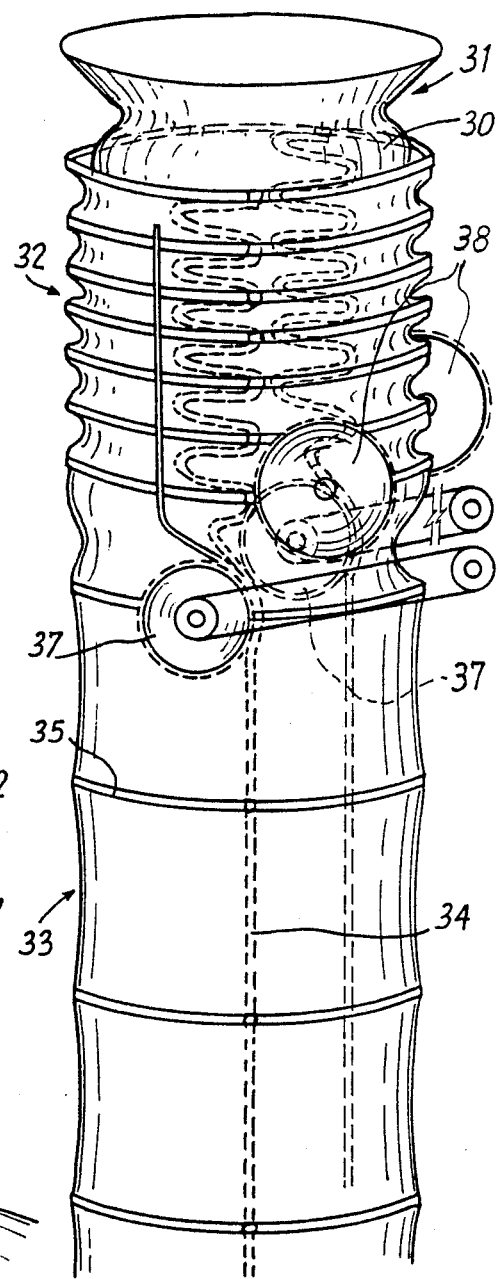
FIG. 4 shows a schematic view in perspective of a third embodiment of the invention.

According to the embodiment of FIGS. 4 et seq., the liner 30 which comprises at its top the restriction 31 forming nozzle, is disposed at the top of the sleeve and it receives on its periphery (as in the example of FIGS. 1 and 2), the stack of the retracted part 32 of the sleeve 33. In the present case, the sleeve is maneuvered by two chains 34 disposed along two diametrically opposite generatrices of the sleeve 33, the chain being connected at regular intervals to the hoops 35 by a joining piece 36. The chain is driven by the driving wheel 37.

As shown in FIG. 4, the rotation of the wheel 37 in anti-clockwise direction ensures lift of the chain and consequently lift of the successive hoops 35, 35' and placing thereof in inactive position for storage or upper position around the liner 30.

The hoops are maintained in position of storage by the brake 38 which meshes on the chain at the level of each join with a hoop 35.

The brake is free-wheeling in clockwise direction so as to allow the stack to rise under the lifting action of the wheel 37; in anti-clockwise direction, the brake 38 is calibrated so as to withstand the thrust corresponding to the maximum weight of the stack of the retracted part of the sleeve 32.

On the other hand, the brake is calibrated to yield to a greater traction which is then exerted by the driving wheel 37 releasing the hoop in immediately lower position within the stack.

When the hoop in immediately lower position is released due to the traction exerted on the chain by the driving wheel, the brake then takes over the immediately upper hoop which then constitutes the hoop resting on the brake and supporting the upstream stack assembly.

Under these conditions, the driving wheel may actuate the chain to descend the hoops since the part of the chain 34 located between the driving wheel 37 and the brake 38 is clear and does not support the weight of the upper stack.

As shown in FIG. 5, the mechanical assembly constituted by the driving wheels and the toothed wheel of the brake 38 meshing on the chain 34 are preferably located between two parallel, vertical plates; these two plates comprise an outer plate 39 and an inner plate which is constituted by two twinned parts 40, 40' defining therebetween a slot 41' allowing the passage of the successive joining pieces so that the stack of the hoops is constantly guided by this slot 41', the hoops thus being maintained in aligned position.

What is claimed is:

1. A device for loading bulk products, of the type comprising a retractable and extensible sleeve having an upper end and a lower end and adapted to guide bulk materials from an upper hopper towards a lower container, the sleeve being formed by a supple wall comprising successive reinforcing annular hoops and successive portions of said supple wall between the said hoops, the device further comprising mechanical lifting means to actuate one end of said sleeve which is thus retracted and extended, respectively, and the sleeve in the actuated end is caused to form successive folds of the portions of the supple wall between two successive hoops, the said retracted end of the sleeve thus being placed in inactive position, wherein said device further comprises an inner protecting liner disposed at the end of the sleeve to be actuated for retraction and extension, respectively, the liner being concentric and inside the sleeve and of a diameter corresponding substantially to a small clearance to the inner diameter of the said folds of the portions of the supple wall folded in accordion manner between two successive reinforcing hoops, the liner thus being adapted to receive against its outer wall the retracted end of the sleeve placed in inactive position and thus protected from the abrasive action of the materials.

2. The device of claim 1, wherein the sleeve comprises two linear supports made of supple material formed by a band of synthetic elastomer material and provided with stepped ribs, each said band is adapted to receive the mechanical action of said mechanical lifting means which is in the form of an adjacently disposed toothed wheel.

3. The device of claim 1 wherein the protecting liner is located inside of the upper end of the sleeve and is adapted to receive the said upper end of the sleeve in a retracted position and the said mechanical lifting means are in engagement on the reinforcing hoops and adapted to provoke the initial retraction of said upper end by upwardly lifting one of said hoops in an upper position before lifting the successive hoops in a lower position, the folds and hoops accumulating towards the upper end of the sleeve around the said protecting liner, the part of the sleeve below said liner thus being totally maintained in an extended position.

4. The device of claim 3 wherein the sleeve comprises a first and a second supple foldable tie connected at regular intervals to the reinforcing hoops, each said tie following a generatrix of the sleeve, and the said mechanical lifting means are in engagement on the first and on the second tie to ensure raising and lowering thereof.

5. The device of claim 4 wherein the mechanical lifting means are disposed at the lower end of the inner protecting liner located inside the upper end of the sleeve, and said mechanical lifting means are adapted to allow the lifting of the supple ties and to accumulate the hoops and the folds of the sleeve above said mechanical lifting means and around the protecting liner.

6. The device of claim 4 wherein said mechanical lifting means comprise a first and a second driving wheel, the first and second supple ties comprise a first and a second chain, respectively, the two chains being diametrically opposite with respect to the sleeve and the chains being connected at regular intervals to the successive hoops, the first chain meshing on the first driving wheel, the second chain meshing on the second driving wheel, the two driving wheels being synchronized, and the device further comprises a first and a second retaining brake each constituted by a toothed wheel, the first retaining brake being enmeshed on the first chain, the second retaining brake being enmeshed on the second chain, and the retaining brakes are situated above the corresponding driving wheel.

7. The device of claim 6 wherein the first and the second retaining brakes are adapted to allow rest and support of the accumulated hoops and folds of the retracted upper end of the sleeve, said retracted end resting by gravity on the retaining brakes, the two retaining brakes being mounted to roll freely in a direction corresponding to the retraction of the sleeve and the said retaining brakes are calibrated to withstand the weight of the upper end of the sleeve in a retracted position and to yield to an effort of traction greater than the above weight during the traction said driving wheels actuate the first and second chains in the movement of extension of the sleeve.

8. The device of claim 4 wherein the device further comprises two parallel plates located in vertical planes, said plates defining an inner space therebetween for displacement and storage of the first and the second chains, the sleeve comprises joining pieces to connect each of the successive hoops to the first chain and to the second chain, and the said plates are provided with a vertical groove for receiving and guiding the said joining pieces.

9. The device of claim 1 wherein the upper part of the sleeve corresponding to the pouring of bulk materials from a source consisting of the group consisting of the hopper and the upper container inside of the sleeve, comprises an initial funnel-shaped narrowing forming a nozzle, centripetal effect allowing the acceleration of the vertical descending movement of the particles and the bringing together and concentration of the major part of the bulk materials towards the center of the sleeve, thus saving the walls.

* * * * *